United States Patent
Heim et al.

(10) Patent No.: US 8,234,283 B2
(45) Date of Patent: Jul. 31, 2012

(54) SEARCH REPORTING APPARATUS, METHOD AND SYSTEM

(75) Inventors: Jason M. Heim, Poughkeepsie, NY (US); Thomas E. Murphy, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 11/858,145

(22) Filed: Sep. 20, 2007

(65) Prior Publication Data

US 2009/0083545 A1    Mar. 26, 2009

(51) Int. Cl.
G06F 17/30 (2006.01)
(52) U.S. Cl. .......................................... 707/747
(58) Field of Classification Search ........... 707/999.006, 707/722, E17.014, 999.01, 706, 747
See application file for complete search history.

(56) References Cited

U.S. PATENT DOCUMENTS

| | | | |
|---|---|---|---|
| 4,965,568 A | 10/1990 | Atalla et al. | |
| 6,507,911 B1 | 1/2003 | Langford | |
| 6,633,915 B1 | 10/2003 | Hashimoto | |
| 6,725,444 B2 | 4/2004 | Fergus | |
| 7,055,030 B2 | 5/2006 | Negawa | |
| 7,373,345 B2 * | 5/2008 | Carpentier et al. | 1/1 |
| 2003/0217060 A1 | 11/2003 | Stockton | |
| 2004/0172409 A1 * | 9/2004 | James | 707/104.1 |
| 2006/0080263 A1 * | 4/2006 | Willis et al. | 705/76 |
| 2007/0005962 A1 | 1/2007 | Baker | |
| 2007/0011739 A1 | 1/2007 | Zamir et al. | |
| 2007/0027867 A1 * | 2/2007 | Ichino | 707/6 |
| 2008/0154879 A1 * | 6/2008 | Lin | 707/5 |
| 2008/0222094 A1 * | 9/2008 | Cox | 707/3 |
| 2008/0263039 A1 * | 10/2008 | Van Lunteren | 707/6 |
| 2010/0005118 A1 * | 1/2010 | Sezer | 707/104.1 |

FOREIGN PATENT DOCUMENTS

JP       2006119859 A     5/2006

* cited by examiner

*Primary Examiner* — James Trujillo
*Assistant Examiner* — Soheila Davanlou
(74) *Attorney, Agent, or Firm* — Cantor Colburn LLP; William A. Kinnaman, Jr.

(57) ABSTRACT

A method of reporting search results of a collection of data is disclosed. The method includes obtaining a hash function and a pattern of data for which to search within the collection of data and searching the collection of data for one or more strings of data that match the pattern. In response to finding one or more strings of data that match the pattern, the method further includes hashing each string that matches the pattern of data with the hash function and creating one or more rows of a results table. Each row of the results table corresponds to one string of data that matches the pattern of data and includes the corresponding hashed string of data.

20 Claims, 5 Drawing Sheets

SEARCH REPORTING APPARATUS, METHOD AND SYSTEM

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention pertains to searches of sensitive data, and reporting of results of such searches.

2. Description of Background

Searches conducted of collections of data for sensitive information can expose the sensitive information to unintended parties. For example, search engine software can index, catalog, and store or cache any publicly visible data that can be found on the Internet. In the process of performing such searches, search engines may index and cache sensitive data that is exposed inadvertently as a result of poorly designed web sites, or intentionally as a means to disseminate private information to other malicious users. Therefore, the search engine can unwittingly become a potential tool for malicious users who devise ways to use an otherwise innocuous search string to mine for the sensitive data of others. An example of such sensitive data may be described as patterns of sixteen-digit sequences starting with a known four-digit prefix, such as may relate to credit cards issued by a particular financial institution.

Institutions and individuals who wish to determine whether or not their sensitive data has been exposed could attempt to discover such using the search engine's normal facilities. However, in doing so the institution or individual will ultimately expose the sensitive data to the search engine and possibly further if the transmission is intercepted. For example, search engine sites often provide "search history data" that disseminates prior search topics in ways that could expose such data.

Current solutions include blocking of searches that include particular patterns that may be related to such sensitive information. Such blocks, however, do not serve to apprise institutions and individuals of the exposure of sensitive information, nor do the blocks serve to identify or notify the web sites including error-prone code that are an inadvertent source of the sensitive information.

Other solutions can include provision of a pattern or algorithm-based search, allowing the institution or individual to perform a broad search that includes only a small, innocuous portion of the sensitive data (removed from its broader context). Although this approach avoids exposing data unnecessarily to the search engine, the results of such searches may include the sensitive data of other individuals or institutions as well as that of the searcher. As such, the pattern-based search adds new opportunity for a malicious user to exploit the existing search engine facilities and mine for data that could be used for improper purposes.

Further solutions can include automatic removal requests for exposed data that matches such patterns/algorithms. However, any such data has already been exposed. Removal of the data may be of little value if a malicious user has already found it before removal. Accordingly, there is a need in the art for a data search reporting arrangement that overcomes these drawbacks.

SUMMARY OF THE INVENTION

The shortcomings of the prior art are overcome and additional advantages are provided through the provision of a search reporting arrangement that utilizes a pattern or algorithm-based data search and encrypts the results of the search such that interception of the search result does not provide unintended exposure of sensitive data.

System and computer program products corresponding to the above-summarized methods are also described and claimed herein.

One embodiment of the invention includes a method of reporting search results of a collection of data. The method includes obtaining a hash function and a pattern of data for which to search within the collection of data, and searching the collection of data for one or more strings of data that match the pattern of data. In response to finding one or more strings of data that match the pattern of data, the method further includes hashing each of the one or more strings that match the pattern of data with the hash function and creating one or more rows of a results table, each row of the one or more rows corresponding to one of the one or more strings of data that match the pattern of data, each row of the results table including corresponding hashed string of data.

A further embodiment of the invention includes a computer program product stored on computer readable media and including computer executable instructions for reporting search results of a collection of data. The product includes instructions for obtaining a hash function and a pattern of data for which to search within the collection of data and searching the collection of data for one or more strings of data that match the pattern of data. In response to finding one or more strings of data that match the pattern of data, the product further includes instructions for hashing each of the one or more strings that match the pattern of data with the hash function and creating one or more rows of a results table, each row of the one or more rows corresponding to one of the one or more strings of data that match the pattern of data, each row of the results table including a corresponding hashed string of data.

Another embodiment of the invention includes a system that includes processing, display, storage, input and output resources for executing machine readable instructions stored in the storage. The machine readable instructions are for reporting search results of a collection of data by instructions for obtaining a hash function and a pattern of data for which to search within the collection of data and searching the collection of data for one or more strings of data that match the pattern of data. In response to finding one or more strings of data that match the pattern of data, the instructions further include hashing each of the one or more strings that match the pattern of data with the hash function and creating one or more rows of a results table, each row of the one or more rows corresponding to one of the one or more strings of data that match the pattern of data, each row of the results table including a corresponding hashed string of data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides results of a search for sensitive data in an encrypted form such that interception of the results by anyone other than an intended party does not expose any sensitive data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention provides an arrangement for safely detecting the exposure of sensitive data within media that is visible to the public on the Internet. "Safely" in this context describes a process of detection that does not itself unwittingly expose the data one intends to protect. "Sensitive data" in this context is any information that is normally kept private by an individual or institution because it may be used for malicious purposes such as identity theft, fraud, or disruption of services. Such safe detection can thereby provide notification to the individual or institution and allow them to take proactive measures to shut down or monitor any activity that might occur based on the data that was exposed.

Figure 1:
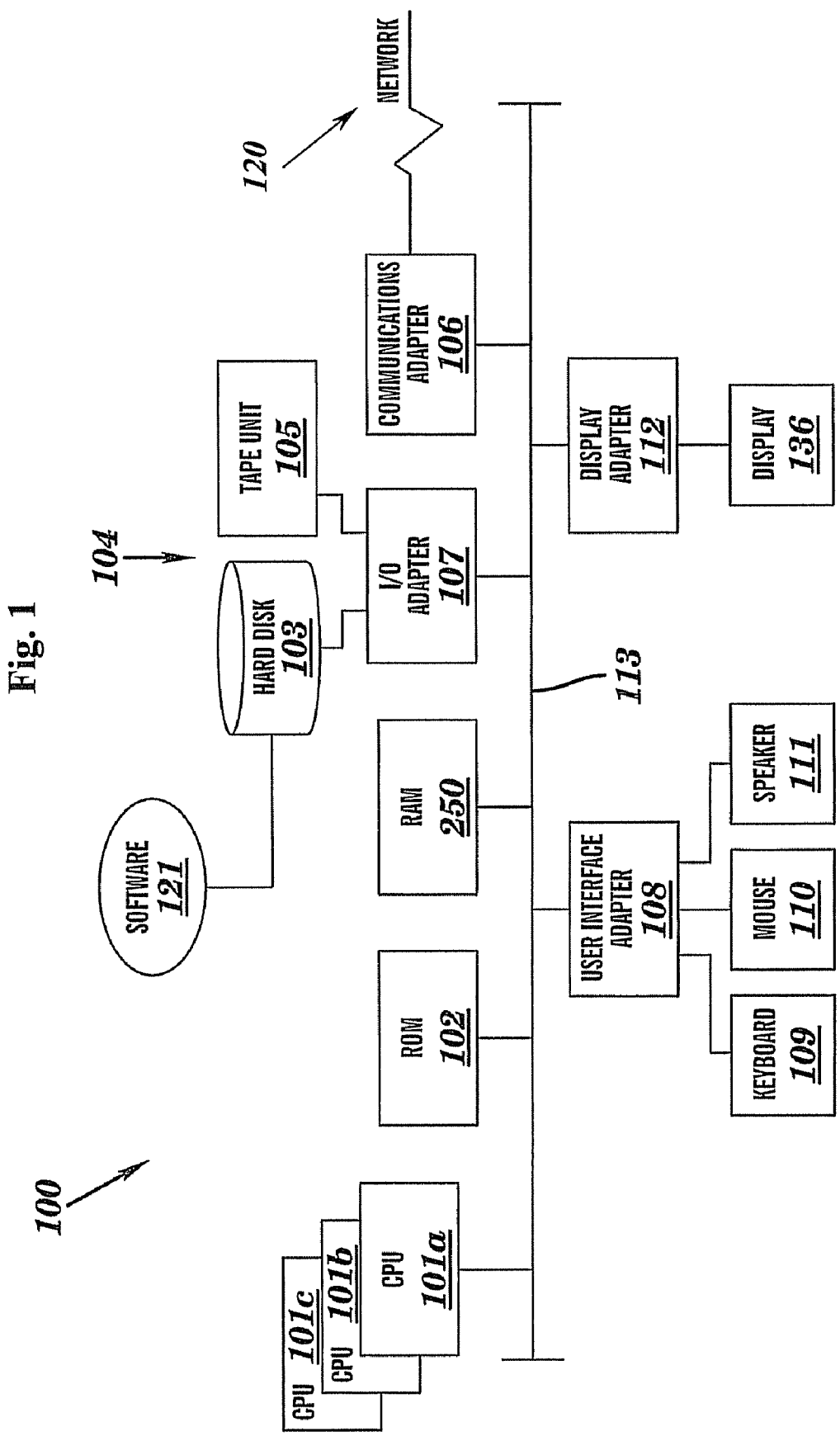
FIG. 1 is a schematic block diagram illustrating one example of an infrastructure for operation of a search reporting arrangement.

FIG. 1 depicts an embodiment of a processing system 100 for implementing the teachings herein. System 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 250 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 120, such as the Internet, thereby enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 may be interconnected to bus 113 via user interface adapter 108, which may include, for example, a Super I/O chip integrating multiple device adapters into a single integrated circuit.

As disclosed herein, the system 100 includes machine readable instructions stored on machine readable media (for example, the mass storage 104) for safely reporting results of a search for a pattern of data within a collection of data. As referred to herein, the instructions may be referred to as "search reporting software" 121. The software 121 may be produced using software development tools as are known in the art.

In one embodiment of the invention, the search reporting software 121 is executed as part of a service offered by a Data-Organizing Business Entity (DOBE), such as a search engine company that tabulates and indexes publicly available data on the Internet. The service will privately investigate collections of data, such as both within its own cache or history (as may be stored upon mass storage 104), as well as newly found online data available via the network 120, such as the Internet. In one embodiment, this service is offered to Sensitive Data Clients (SDCs), which may be business entities such as financial institutions, or individual clients for example. SDCs possess sensitive data, such as a credit card number and information associated with the credit card number for example, which could be used maliciously if exposed in the public realm.

The DOBE service offers the SDC an ability to request a search using patterns, such as Regular Expressions (regexp). One example of a Regular Expression is a pattern of data including sixteen digits that start with four specific digits, such as may represent credit card data. These patterns, by themselves, do not expose sensitive data and assist the DOBE in recognizing a string of data as potentially sensitive. As part of this service, the SDC also provides to the DOBE a hash function that will be used if matches are found, as will be described further below.

The DOBE service uses one or more patterns provided by the SDC to analyze the collection of data that it has already indexed, as well as data it is currently indexing, to seek strings of data that match the pattern. In response to a "match" between the pattern and a string of data within the collection of data, the search reporting software 121 creates a results table 200 (shown in FIG. 2). For each "match" between the pattern and a string of data 205, the results table 200 includes a result row, such as the result row 210. To create this result row, the matching string of data 205 is hashed using the hash function provided by the SDC, thereby creating a hashed match, such as the hashed match 220 within the result row 210. The result of this hash, due to its one-way nature, cannot be decrypted.

Appropriate context data 230 associated with the matching string of data 205 found is also inserted within the result row 210 corresponding to the hashed match 220. Depending on implementation, more than one column of context data 230 may be associated with each hashed match 220. Examples of appropriate context data 230 associated with the hashed match 220 include an amount of text before and after the matching string 205, a uniform resource locator (URL) corresponding to a web page upon which the matching string 205 was found, a date and time the matching string 205 was cached, the original hypertext markup language (HTML) associated with the web page upon which the matching string 205 was found, an identifier corresponding to the pattern of data that was searched, and any preprocessed keywords contained within the web page. Following creation of the results table 200, the DOBE may review its content, such as by displaying the results table 200 upon the display 136, for example.

The SDC has available a hash table 240 having two columns. Each row within a first column 250 includes a string of specific sensitive data, such as an actual credit card number, for example. The corresponding row within the second column 260 includes hashed items that result from application of the hash (using the same hash function provided by the SDC to the DOBE) to the string of sensitive data in the first column 250.

In one embodiment, security of information within the results table 200 is provided via an identification authentication (such as an account number and password) that is provided by the SDC to the DOBE. Following the identification authentication, the SDC is given access to the list of hashed matches 220, such as the hashed matches 220 that match the one or more patterns provided by the SDC, as included within a first column 236 of the results table 200. An example of such access is to display the first column 236 of the results table 200 upon the display 136. The SDC then compares the hashed matches 220 to the hashed items within the second column 260 of the hash table 240. If the SDC finds a match between the hashed item within the second column 260 and the hashed match 220, context data 230 within the results table 200 that corresponds to the match is provided to the SDC, such as upon the display 136, for example.

In another embodiment, security of information within the results table 200 is provided via encryption of the context data 230 using a two-way algorithm, or key before it is inserted into the corresponding result row 210 of the results table 200. To decrypt this data, the matching string 205 itself (before the hash) will be the key. Therefore, each result row 210 of the results table 200 includes a minimum of two columns. The first column 236 includes the hashed match 220 following the one-way hash and a second column 234 includes context data 230 encrypted using the original matching string 205 of data as the key. Accordingly, in an embodiment in which the results table 200 includes the hashed match 220 and the encrypted context data 230, the results table 200 is in a secure format and can then be provided to the SDC in its entirety for review, such as being displayed upon the display 136. Furthermore, if the results table 200 in the secure format is intercepted by a malicious user, sensitive data is not exposed to the malicious user. Therefore, because the results table 200 is in the secure format, such identification authorization is not necessarily required. Additionally, the results table 200 can be delivered by the DOBE in the form of encrypted computer code, via the network 120 as well as via tangible media, such as any of floppy diskettes, CD-ROMs, USB (universal serial bus) drives, or any other computer readable storage medium.

Figure 2:
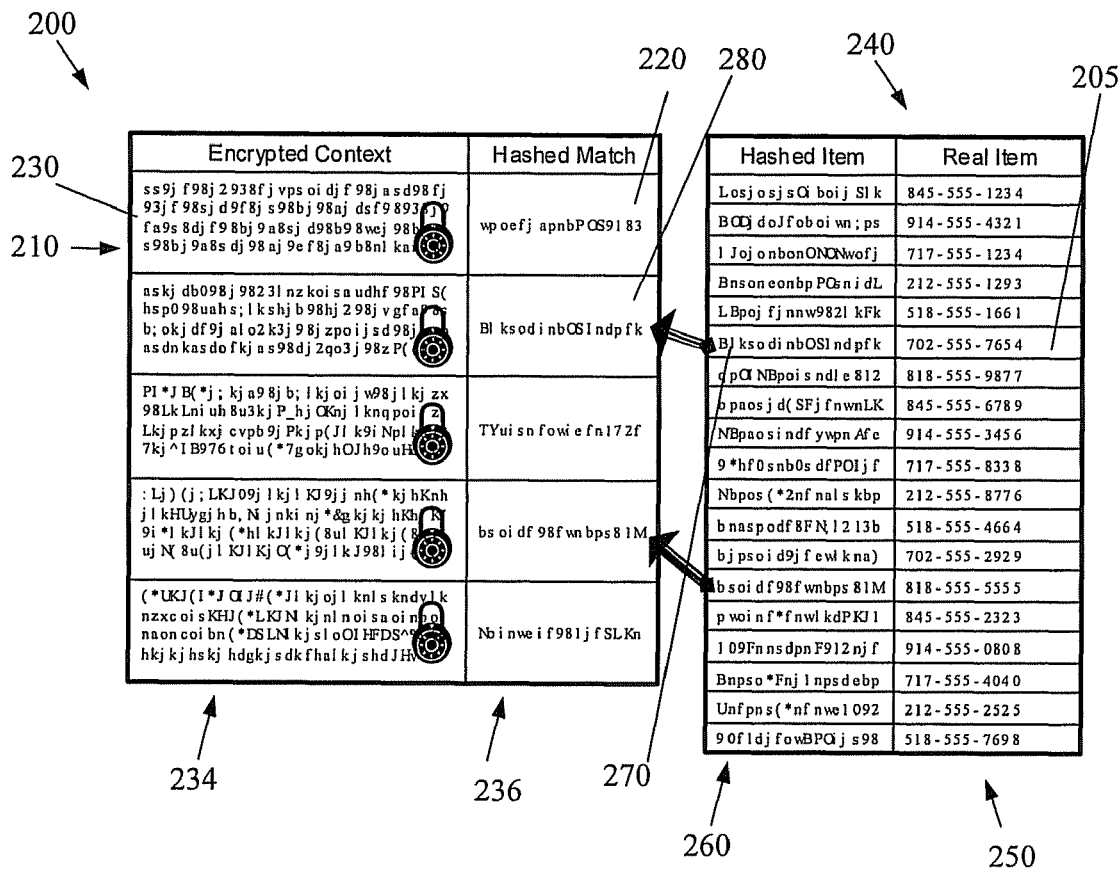
FIG. 2 is a schematic diagram illustrating one example of an encrypted search results table and a client hash table.

Upon receipt of results table 200, the SDC may arrange or sort both the results table 200 and the hash table 240 by the hashed item in the second column 260 and the hashed match 220 in the first column 236. This assists facilitation of determining if there is a match between the hashed items in the rows of the second column 260 and the hashed matches 220 in the first column 236 of the results table 200. Alternatively, automated matching algorithms may be employed to determine if any such matches exist. For example, FIG. 2 depicts a match between hashed item 270 and hashed match 280.

Figure 3:
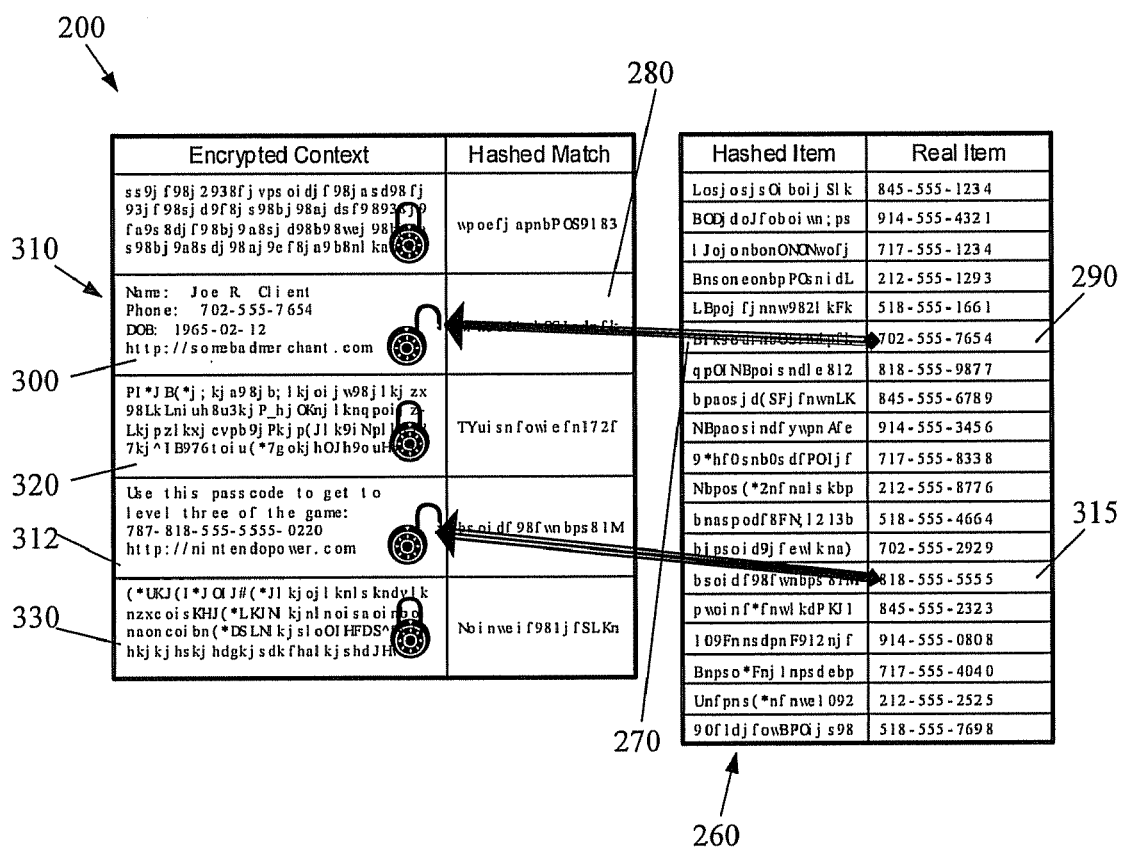
FIG. 3 is a schematic diagram illustrating one example of an encrypted search results table having unencrypted rows that correspond to matches with the client hash table.

Referring now to FIG. 3, in response to discovery by the SDC that hashed item 270 matches hashed match 280, the SDC uses the original string of data 290 as the key to decrypt the corresponding context data 300 within the associated result row 310. This context data 300 may then be examined by the SDC to determine if the match is a genuine exposure of sensitive data, such as personal information associated with a credit card number, as shown within context data 300. Alternatively, the context data (such as context data 312) may indicate that the matching string of data (such as matching string of data 315) is merely a coincidence, and includes no sensitive data.

Accordingly, the SDC can only unlock context data 300, 312 within rows of the results table 200 that include data to which the SDC has the matching string 290, 315. Context data 320, 330 within other rows remain locked and encrypted. This protects the data within the results table 200, ensures that the only exposure of sensitive data is to a proper SDC, and makes the results table 200 effectively worthless to a malicious user that may have intercepted its transmission.

Following discovery of a genuine exposure of sensitive data, the SDC may take a number of actions as a response. Of course, removing the publicly visible data is desirable, but at this point the exposure has already occurred and cannot be completely undone. However, tracking down the URL and notifying its owner of possible web page code errors can be useful in preventing further leaks of sensitive data. Furthermore, action can be taken by the SDC to ensure that the sensitive data is not abused, such as by issuing new credentials or enabling a watchdog service to detect fraudulent use, for example.

Figure 4:
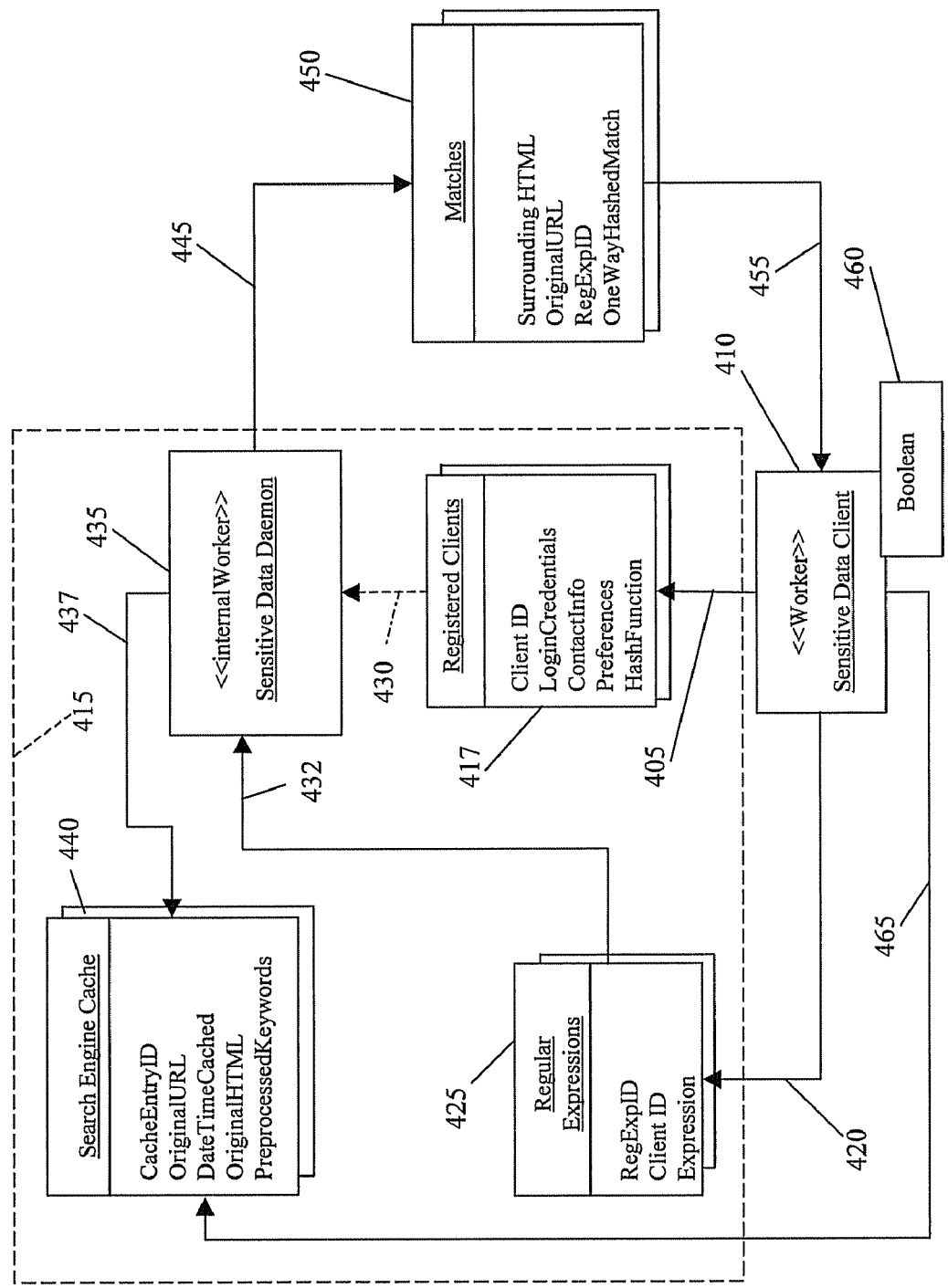
FIG. 4 is a collaboration diagram identifying an exemplary sequence of events and information flow of the search reporting arrangement.

FIG. 4 depicts a collaboration diagram that identifies a sequence of events and flow of information relating to one implementation of the search reporting software 121 described above. The implementation includes a registration 405 of the SDC 410 with the DOBE 415, by providing to the DOBE 415 registration information 417 such as credentials, preferences, and the hash function. Additionally, the SDC 410 registers 420 with the DOBE 415 the patterns of data 425, such as regular expressions, to evaluate against the collection of data 440. The registration 420 of the regular expressions 425 may further include identifiers associated with the specific regular expression to be evaluated, and a client identification of the SDC 410.

A background process 435, such as a sensitive data daemon of the DOBE 415, retrieves 430 the registration information 417. The sensitive data daemon 435 further retrieves 432 the patterns of data 425 to be evaluated and searches 437 the collection of data 440, such as a search engine cache, as well as any new data indexed by the search engine, for matches to the patterns 425. In addition to searching for matches of strings of data to the patterns 425, the sensitive data daemon 435 also seeks context information associated with the strings of data that match the patterns of data 425.

The DOBE 415 then organizes 445 matches 450 of the strings of data 205 into the results table 200 (shown in FIGS. 2 and 3). As described above, the matches 450 of strings of data 205 within the results table 200 are hashed with the hash function, and the context data 230 may be encrypted with the two-way encryption key.

In one embodiment, the SDC 410 then receives 455 the matches 450 in the form of the results table 200, and compares the hashed matches 220 in the first column 236 of the results table 200 with the second column 260 of the hash table 240 to determine if there are any hashed items that are the same as the hashed match, such as hashed item 270 and hashed match 280. The SDC further utilizes a Boolean function 460 to examine the context data 300, 312 with the two-way encryption key to confirm whether an exposure to sensitive data has occurred. Following a confirmation that an exposure of sensitive data has occurred, the SDC may take appropriate defensive responses 465 to the confirmed exposures, such as to request that the matching strings of data 205 within the collection of data 440 that match the patterns 425 are removed from collection of data 440. Additional preventative defensive responses 465 may include, but are not limited to, notifying the web site associated with the matching string of data 205 that it has code errors, and replacing any credentials associated with the exposure of sensitive data.

Figure 5:
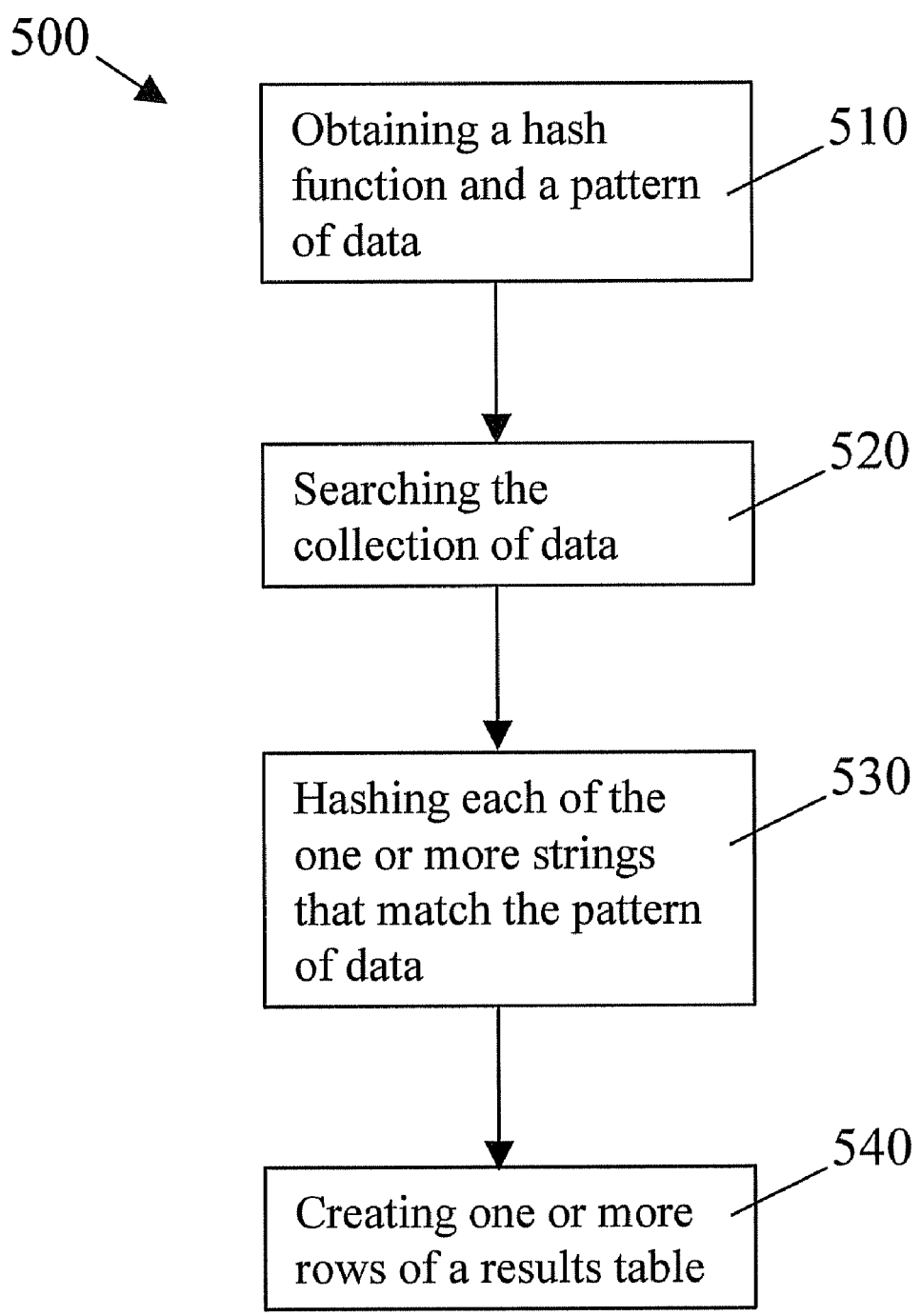
FIG. 5 is a flowchart illustrating an exemplary method of securely reporting search results.

In view of the foregoing, the system 100 executes software 121 and performs a method for securely reporting search results of the collection of data 440, as may be stored on the storage device 103, 105, or accessible via the network 120. Referring to FIG. 5 in conjunction with FIGS. 2 through 4, a flowchart 500 of process steps of the method is depicted.

The method begins at block 510 by obtaining the hash function and the pattern of data 425 for which to search within the collection of data 440. The method proceeds at block 520 by searching the collection of data 440 for one or more strings of data 205 that match the pattern of data 425. In response to finding one or more strings of data 205 that match the pattern of data 425, hashing, at block 530, each of the one or more strings 205 that match the pattern of data 425 with the hash function, thereby creating the hashed match 220, 280.

The method concludes at block 540 by creating one or more result rows 210 of the results table 200, each row 210 corresponding to one of the one or more strings of data 205 that match the pattern of data 425, and including the corresponding hashed match or encrypted string of data 220, 280.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of reporting search results of a collection of data, the method comprising:
   obtaining a hash function and a pattern of data for which to search within the collection of data;
   searching the collection of data for one or more strings of data that match the pattern of data;
   for each string of data in the one or more strings of data that match the pattern of data:
     creating a hashed value by hashing the string of data with the hash function; and
     creating a row in a results table, the row in the results table comprising the hashed value;
   creating one or more sensitive data hash values by applying the hash function to one or more sensitive data strings;
   comparing the one or more sensitive data hash values to each of the hashed values in the results table; and
   determining if the collection of data includes the one or more sensitive data values in response to the comparing.

2. The method of claim 1, wherein the creating the row comprises:
   inserting into each of the rows of the results table data associated with one of the one or more strings of data that match the pattern of data.

3. The method of claim 2, wherein the inserting comprises:
   inserting into each of the rows of the results table at least one of:
     a uniform resource locator (URL) corresponding to one of the one or more strings of data that match the pattern of data;
     data surrounding one of the one or more strings of data that match the pattern of data;
     a date and time corresponding to one of the one or more strings of data that match the pattern of data;
     hypertext markup language (HTML) corresponding to one of the one or more strings of data that match the pattern of data; and
     combinations thereof.

4. The method of claim 2, further comprising:
   encrypting the data associated with each of the one or more strings of data with a two-way encryption key.

5. The method of claim 4, wherein the encrypting the data comprises:
   encrypting the data associated with each of the one or more strings of data with a two-way encryption key that is the string of data that matches the pattern of data.

6. The method of claim 1, wherein the obtaining further comprises:
   obtaining an identifier for the pattern of data.

7. The method of claim 6, wherein the creating the row comprises:
   inserting into each of the rows of the results table the identifier for the pattern of data which one of the corresponding one or more strings of data matches.

8. The method of claim 1, wherein the searching the collection of data comprises:
   searching a cache of web pages.

9. The method of claim 1, wherein the pattern of data comprises a regular expression.

10. A computer program product stored on a non-transitory computer readable media and comprising computer executable instructions for reporting search results of a collection of data, the product comprising instructions for:
    obtaining a hash function and a pattern of data for which to search within the collection of data;
    searching the collection of data for one or more strings of data that match the pattern of data;
    for each of string of data in the one or more strings of data that match the pattern of data:
    creating a hashed value by hashing the string of data with the hash function; and
    creating a row in a results table, the row in the results table comprising the hash value;
    creating one or more sensitive data hash values by applying the hash function to one or more sensitive data strings;
    comparing the one or more sensitive data hash values to each of the hashed values in the results table; and
    determining if the collection of data includes the one or more sensitive data values in response to the comparing.

11. The computer program product of claim 10, wherein the creating of the row comprises:
    inserting into each of the rows of the results table data associated with one of the one or more strings of data that match the pattern of data.

12. The computer program product of claim 11, wherein the inserting comprises:
    inserting into each of the rows of the results table at least one of:
    a uniform resource locator (URL) corresponding to one of the one or more strings of data that match the pattern of data;
    data surrounding one of the one or more strings of data that match the pattern of data;
    a date and time corresponding to one of the one or more strings of data that match the pattern of data;
    hypertext markup language (HTML) corresponding to one of the one or more strings of data that match the pattern of data; and
    combinations thereof.

13. The computer program product of claim 11, further comprising:
    encrypting the data associated with each of the one or more strings of data with a two-way encryption key.

14. The computer program product of claim 13, wherein the encrypting the data comprises:
    encrypting the data associated with each of the one or more strings of data with a two-way encryption key that is the string of data that matches the pattern of data.

15. The computer program product of claim 10, wherein the obtaining further comprises:
    obtaining an identifier for the pattern of data.

16. The computer program product of claim 15, wherein the creating the rows comprises:
    inserting into each of the rows of the results table the identifier for the pattern of data which one of the corresponding one or more strings of data matches.

17. The computer program product of claim 10, wherein the searching the collection of data comprises:
    searching a cache of web pages.

18. The computer program product of claim 10, wherein the obtaining a pattern of data comprises:
    obtaining a regular expression.

19. A system comprising:
    a central processing unit (CPU) configured to execute machine readable instructions, the machine readable instructions for reporting search results of a collection of data by obtaining a hash function and a pattern of data for which to search within the collection of data;
    searching the collection of data for one or more strings of data that match the pattern of data;
    for each string of data in the one or more strings of data that match the pattern of data:
    creating an encrypted value by encrypting the string of data with the one way encryption key; and
    creating a row in the results table, the row in the results table comprising the encrypted value;
    creating one or more sensitive data encrypted values by applying the one way encryption key to one or more sensitive data strings; and
    comparing the one or more sensitive data encrypted values to each of the encrypted values in the results table; and
    determining if the collection of data includes the one or more sensitive data values in response to the comparing.

20. The system of claim 19, the machine readable instructions further comprising instructions for:
    inserting into each of the rows of the results table data associated with one of the one or more strings of data that match the pattern of data; and
    encrypting the data associated with each of the one or more strings of data with a two-way encryption key.

* * * * *